United States Patent
Hawkinson et al.

(10) Patent No.: US 11,761,264 B2
(45) Date of Patent: *Sep. 19, 2023

(54) ACTIVE MAGNETIC RANGING WHILE DRILLING

(71) Applicant: Scientific Drilling International, Inc., Houston, TX (US)

(72) Inventors: Ben Hawkinson, Paso Robles, CA (US); Jamie Dorey, Houston, TX (US); Douglas Ridgway, Edmonton (CA)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,388

(22) Filed: Apr. 21, 2022

(65) Prior Publication Data

US 2022/0243535 A1    Aug. 4, 2022

Related U.S. Application Data

(63) Continuation of application No. 17/538,930, filed on Nov. 30, 2021, now Pat. No. 11,634,950.

(60) Provisional application No. 63/119,531, filed on Nov. 30, 2020.

(51) Int. Cl.
| | |
|---|---|
| *E21B 7/04* | (2006.01) |
| *E21B 47/04* | (2012.01) |
| *G01D 5/14* | (2006.01) |
| *E21B 47/13* | (2012.01) |
| *G01C 19/00* | (2013.01) |

(52) U.S. Cl.
CPC ............. *E21B 7/04* (2013.01); *E21B 47/04* (2013.01); *E21B 47/13* (2020.05); *G01C 19/00* (2013.01); *G01D 5/14* (2013.01)

(58) Field of Classification Search
CPC .... E21B 47/0228; E21B 47/04; E21B 47/092; E21B 47/13; E21B 7/04; G01D 5/14; G01C 19/00
See application file for complete search history.

(56) References Cited

U.S. PATENT DOCUMENTS

| | | | | |
|---|---|---|---|---|
| 2008/0041626 | A1* | 2/2008 | Clark | G01V 3/26 340/854.6 |
| 2014/0374159 | A1* | 12/2014 | McElhinney | E21B 44/005 175/45 |
| 2015/0268371 | A1* | 9/2015 | Donderici | G01V 3/26 324/346 |

(Continued)

*Primary Examiner* — Caroline N Butcher
(74) *Attorney, Agent, or Firm* — Ewing & Jones, PLLC (57) ABSTRACT

A magnetic ranging system for use with a drilling assembly in a borehole in a formation, the drilling assembly including a drill string, a drill bit and a bottomhole assembly (BHA) connected to the drill bit, the BHA including a measurement-while-drilling (MWD) system, a bi-directional MWD telemetry interface, and a steerable component, may comprise at least one ranging magnetometer incorporated into the BHA. The ranging magnetometer may be configured to collect ranging measurements from behind the drill bit and the ranging magnetometer may be configured to transmit measurement data. The magnetic ranging system may include at least two ranging magnetometers, with one ranging magnetometer positioned above the MWD system and one ranging magnetometer positioned below the MWD system.

18 Claims, 9 Drawing Sheets

(56) References Cited

U.S. PATENT DOCUMENTS

2017/0138173 A1\* 5/2017 Estes ..................... E21B 47/092
2018/0210107 A1\* 7/2018 Donderici ............... E21B 47/26
2021/0254448 A1\* 8/2021 Phillips ................. E21B 47/022

\* cited by examiner

ACTIVE MAGNETIC RANGING WHILE DRILLING

RELATED APPLICATIONS

The present application is a continuation application which claim priority from U.S. utility application Ser. No. 17/538,930, filed Nov. 30, 2021 which is itself a nonprovisional application which claims priority to U.S. application Ser. No. 63/119,531 entitled "Active Magnetic Ranging Integrated with a Drilling System" and filed Nov. 30, 2020, each of which is hereby incorporated by reference in its entirety.

BACKGROUND

Nonaccess ranging may be used for construction of relief wells and complex plug and abandonment projects where the distance and direction to a target borehole is measured without access to the target. In some drilling contexts, rotary steerable drilling systems may be used to achieve desired rates of penetration or total depths. In traditional systems, magnetic ranging measurements are made with a separate run using a wireline tool. During drilling stops, the drilling bottom hole assembly is tripped to surface, the wireline tool is deployed, measurements are made, the wireline tool is removed and a drilling BHA is tripped in to resume drilling.

Access-dependent ranging may be used for construction of complex multi-bore geometries in which both bores are accessible from surface down to the point where ranging to or from is required. In traditional systems, the target well must have at least a portion of its drilling completed so that the drilling assembly may be removed and an active ranging system inserted into the target using wireline.

SUMMARY

In some embodiments, a magnetic ranging system may be provided for use with a drilling assembly in a borehole in a formation. The drilling assembly may include a drill string, a drill bit and a bottomhole assembly (BHA) connected to the drill bit, the BHA including a measurement-while-drilling (MWD) system, a bi-directional MWD telemetry interface, and a steerable component. The magnetic ranging system may comprise at least one ranging magnetometer incorporated into the BHA, the ranging magnetometer may be configured to collect ranging measurements from behind the drill bit, and the ranging magnetometer may be configured to transmit measurement data.

The magnetic ranging system may include at least two ranging magnetometers, with one ranging magnetometer positioned above the MWD system and one ranging magnetometer positioned below the MWD system. The magnetic ranging system may include at least two ranging magnetometers and at least one ranging magnetometer may be integral with the MWD system.

The magnetic ranging system may include at least two ranging magnetometers, with one ranging magnetometer positioned above the steerable component and one ranging magnetometer positioned below the steerable component. The magnetic ranging system may include at least two ranging magnetometers and one ranging magnetometer may be integral with the steerable component.

At least one ranging magnetometer may be configured to measure a field gradient. At least one magnetometer may be mounted in the bottom drive shaft of the steerable component. At least one ranging magnetometer may be configured to transmit measurement data via an MWD telemetry interface.

The magnetic ranging system further may include an injection electrode and a return electrode above the injection electrode. The injection electrode may be configured to inject current into the formation. The injection electrode and the return electrode may both be supported on the drill string above the ranging magnetometer. The injection electrode may be in the bit and the return electrode may be above the bit such that at least one ranging magnetometer may be between the injection and return electrodes.

The magnetic ranging system may further include a power supply for the injection electrode The power supply may be integral with the BHA. A portion of the bottom hole assembly between an electrode and the ranging magnetometer may be electrically insulated from formation and wellbore fluids. An electrical connection between a power supply and the injection electrode may comprise at least one of a wireline, a wire passing through the drillstring, and an insulated current path integrated with the drillstring.

In other embodiments, a system for drilling first and second boreholes in a formation may comprise a first drilling assembly in the first borehole and a second drilling assembly in the second borehole. The first drilling assembly may include a first drill string, a first drill bit and a first bottomhole assembly (BHA) connected to the first drill bit. The first BHA may include a first measurement-while-drilling (MWD) system, a first bi-directional MWD telemetry interface, a first steering component, and a first magnetic field source comprising at least one permanent magnet having a north-south axis perpendicular to the longitudinal axis of the first BHA, so as to create an elliptically polarized magnetic field during longitudinal rotation of the first BHA. The second drilling may include a second drill string, a second drill bit and a second BHA connected to the second drill bit, the second BHA including a second MWD system, a second bi-directional MWD telemetry interface, a second steering component, and at least one ranging magnetometer incorporated into the BHA, the first ranging magnetometer may be configured to collect ranging measurements of the elliptically polarized magnetic field generated in the first drilling assembly, the ranging measurements are collected from a location behind the second drill bit.

The first and second BHAs may each include at least one permanent magnet having a north-south axis perpendicular to the longitudinal axis of said respective BHA and at least one ranging magnetometer incorporated into the respective BHA. The first and second ranging magnetometers may be configured to collect ranging measurements from behind the first and second drill bit, respectively.

At least one of the first and second BHAs may include two permanent magnets having a north-south axis perpendicular to the longitudinal axis of the first BHA, and the two permanent magnets may be above and spaced apart along the at least one BHA. The first and second BHAs each may include a second permanent magnet having a north-south axis perpendicular to the longitudinal axis of said respective BHA, and each second permanent magnet may be above and spaced apart along the respective BHA from the respective first permanent magnet.

In other embodiments, a method for drilling first and second boreholes may comprise a) providing a system for drilling first and second boreholes in a formation, the system comprising: a first drilling assembly in the first borehole, the first drilling assembly including a first drill string, a first drill bit and a first bottom hole assembly (BHA) connected to the first drill bit, the first BHA including a first measurement-while-drilling (MWD) system, a first bi-directional MWD telemetry interface, a first steerable component, and a first magnetic field source; and a second drilling assembly in the second borehole, the second drilling assembly including a second drill string, a second drill bit and a second BHA connected to the second drill bit, the second BHA including a second MWD system, a second bi-directional MWD telemetry interface, a second steerable component, and at least one ranging magnetometer incorporated into the BHA, the first ranging magnetometer configured to collect ranging measurements from behind the second drill bit; b) during rotation of the first BHA, generating a magnetic field using the first magnetic field source; c) using the at least one ranging magnetometer in the first or second well to measure the magnetic field created in step b); and d) using the measurements made in step c) to steer at least one of the first and second drilling assemblies.

The first and second drilling assemblies may both be rotating during step b). The magnetic field source may comprise at least one permanent magnet having a north-south axis perpendicular to the longitudinal axis of the first BHA, so as to create an elliptically polarized magnetic field during longitudinal rotation of the first BHA. Step c) may be carried out without tripping out the first or second drillstring or requiring wireline access to the first or second borehole.

The magnetic field source may comprise one or more permanent transverse magnets having a north-south axis perpendicular to the axis of the first borehole so as to create an elliptically polarized alternating magnetic field during rotation of the first BHA, the ranging magnetometer may have at least two axes orthogonal to the axis of the second borehole, and the ranging magnetometer may include sensors mounted so as to enable determination of their direction with respect to the second MWD system.

The magnetic field source may comprise a current injected into formation. The first drilling assembly may further include an electrode for injecting current into the formation, and power may be supplied to the electrodes via an insulated current path that may be integral with the drillstring.

Step d) may include measuring a passive magnetic signature of a ferromagnetic target and computing a distance and direction to the target. Step d) may include making distance and direction calculations downhole. The method may further include a step of communicating a bit depth downhole from surface and used the bit depth in step d). The method may further include a step of communicating measurement data to the surface and/or a step of communicating raw data to the surface. The method may further include repeating steps b)-d) without surface intervention. Step d) may include making steering decisions based on active data alone, passive data, or a combination of active and passive data.

The first and second drilling assemblies may each include at least two magnetic field sources and at least one ranging magnetometer. Step b) may comprise using each magnetic field source to generate a distinct magnetic field, and step c) may comprise using the ranging magnetometers in the first and second boreholes to measure the magnetic fields created in step b). Step d) may include combining measurements made in step c) with averaging or data fitting techniques including wellbore survey information, or with machine learning methods.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Active Ranging While Drilling (ARWD)

Certain embodiments include a system for active magnetic ranging while-drilling (ARWD). These technologies allow ranging shots to be acquired during drilling operations. In operations, the system allows collection of active ranging shots during each cycle of the rig mud pumps, whether at connection or for dedicated ranging shots. Using techniques disclosed herein, ranging shots can be collected on-demand. Furthermore, the techniques disclosed herein reduce drilling risk by eliminating significant static open hole operations that would otherwise be required while wireline tools are run.

As used herein, "above" and "behind" each mean relatively closer to the surface as measured along the drillstring or along the borehole.

As used herein, ""measurement data" refers to all forms of data resulting from magnetic field measurements, accelerometer measurements, and gyroscope measurements, including but not limited to raw or processed magnetic field data, computed vectors, ranging results and qualifiers.

Likewise, although many components many be depicted as separate, any of these items may be integrated together into single components as is common in the art. Such integration does not impact functionality.

In some embodiments, an ARWD system may include, for example, a gradient magnetometer array (GMA), a downhole current injection (DCI) system, and an MWD controller. These components may be included on or form part of the Bottom Hole Assembly (BHA).

MWD Gradient Magnetometer Array

Active Magnetic Ranging may use gradient magnetometer systems to detect magnetic fields generated when current flows along a target borehole's casing. In some embodiments, a MWD Gradient Magnetometer Array (GMA) may be included on or integrated into to the BHA and connected to the MWD system.

The GMA may include integrated control and digital signal processing electronics and subsystems that control data acquisition from a multi-axis magnetometer array. Processed data may be provided to the host MWD system via MWD interconnects, which may also allow for bi-directional triggering, communication and power. In some embodiments, an ARWD system design may include a second, concurrently operating GMA in the MWD system. This provides further efficiency, ranging accuracy, redundancy, and direct calculation of relative target trajectory by enabling simultaneous magnetic field measurements at two distances from the target wellbore casing.

Downhole Current Injection System

Active magnetic ranging uses an accumulation of injected current onto the target borehole's casing to create a magnetic field that can be detected by the ranging magnetometers. In some embodiments, a downhole current injection system may include a BHA-mounted current injection system that is a self-contained unit with power generation, storage, conditioning, and injection switching. The downhole current injection system may also include one or more electrical isolation devices that provide electrical insulation for the injection electrodes so as to ensure a desired geometry for current injection to the surrounding formation while avoiding leakage back to the drilling BHA. One or more electrical isolation devices may be integral with the BHA or mounted on the BHA.

MWD System Integration

The downhole current injection system may be integrated with an MWD system. In certain embodiments, when the MWD detects no-flow (e.g. at a connection), an MWD survey will be triggered. In some embodiments of an ARWD system, the MWD may also initiate current injection by the connected downhole current injection system, while simultaneously triggering data acquisition in the GMA. Following that acquisition, the GMA may complete initial downhole processing of the acquired data using ranging algorithms and may pass the processed data to the MWD. At a desired time, such as when drilling resumes, the processed data may then be telemetered to surface using the host MWD system.

Downhole Generator/Injection Unit

In some embodiments, a downhole injection unit (DIU) may be separate unit from the main MWD. By way of example only, a DIU may be located 60-100 ft above the main MWD system. In some embodiments, the DIU may generate and store injection energy during periods when drilling fluids are circulating and may be triggered to release the stored injection energy when the system executes a "ranging shot" during a period of no fluid circulation. The DIU may inject High Voltage AC current into formation via injection electrodes. An exemplary injection may have the following parameters: 300 VAC, 2-10 Hz, 5-10 A, and may last 10-30 seconds per shot. A DIU may be installed in fixed collar with fixed lower injection electrode.

Lower Injection Electrode and Gaps

In some embodiments, a ARWD system may include a lower current injection sub positioned between a lower wired pipe gap sub and a gap sub, with the wired pipe gap sub above the injection sub. The subs use standard wired pipe connections, thereby allowing additional gap subs to be added if required to increase insulation/reduce current accumulation. The lower injection sub may include a stabilizer to reduce gap shorting and improve formation contact and may include a sonde-to-wired pipe interface for top contact.

Upper Injection Electrode and Gaps

Like the lower current injection system, an upper injection system may include a wired pipe gap sub and an upper injection sub. Upper wired pipe gap sub may be connected to a wired pipe-to-sonde sub that converts wired pipe back to connections internal to the drill string. The wired pipe-to-sonde sub may or may not be integrated into the upper injection sub. The upper injection sub may include a stabilizer to reduce gap shorting and improve formation contact and may include a sonde-to-wired pipe interface for top contact. Upper injection system may include a wireline wet connect to enable injection power to be transmitted from the surface and to enable high-speed data transfer for multiple shots.

In some embodiments, the upper injection electrode may include a wet connect male configured to receive a mono-conductor wireline to be "stabbed in." This allows the injection system to accept power from a surface source. The connection may be to either the upper injection electrode, the lower injection electrode, or both. A special realtime mode for direct communications to MWD controller may be enabled, with communication occurring either by lower section wired pipe or short hop electromagnetic communications.

Gradient Magnetometer Unit

In some embodiments, a gradient magnetometer unit (GMU) may include a plurality of tri-axial high-sensitivity, low noise magnetometers defining a cross-borehole plane. In some embodiments, the GMU may include four tri-axial high-sensitivity, low noise magnetometers, with three magnetometers being evenly spaced about the tool axis and defining a cross-borehole plane and a fourth magnetometer positioned on the tool axis and spaced apart from the cross-borehole plane. The magnetometers may have a 10-30 second sample time, including processing and filtering. In some embodiments, the magnetometer assembly is calibratable (possibly as a sub, depending on magnetic content). In some embodiments, a BHA may include two GMUs, with one GMU positioned above the MWD system and one below the MWD system.

In some embodiments, a connection between the BHA and an injection sub may comprise a direct connect (part of BHA), a wired pipe connection, or an installed wireline connection. A connection between injection electrodes may comprise a wired pipe connection, or an installed wireline connection.

Injection/Generator Unit Surface Wireline Connection

In some embodiments, a system for nonaccess ARWD may include a steerable motor and/or rotary steerable system. In certain embodiments, the drilling assembly may include:
a) a plurality of collar-based magnetometers, which, in certain embodiments may be radially displaced from the tool axis,
b) injection and return electrodes adapted to contact the formation. In certain embodiments, the wiring or other current paths may be within the BHA,
c) a current injection power supply integrated with the tool, adapted to energize the electrodes to inject current into formation,
d) a downhole computer adapted to carry out the processing and data reduction, and
e) a communication system allowing commands and configuration to be sent downhole and relay results to the surface.

Figure 1A:
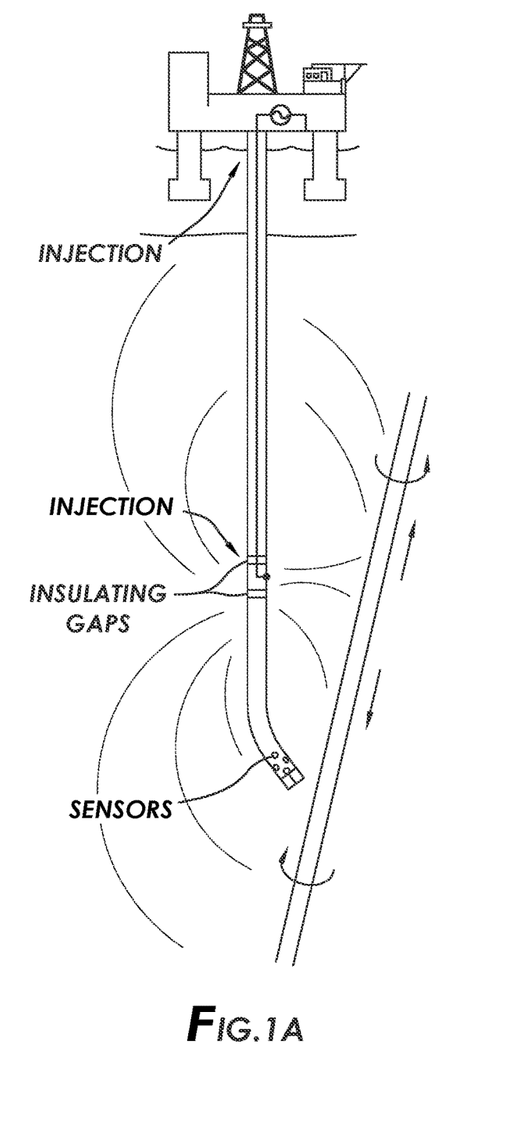
FIGS. 1A-1C are schematic diagrams illustrating three concepts relating to an embodiment of the present disclosure.
Figure 1B:
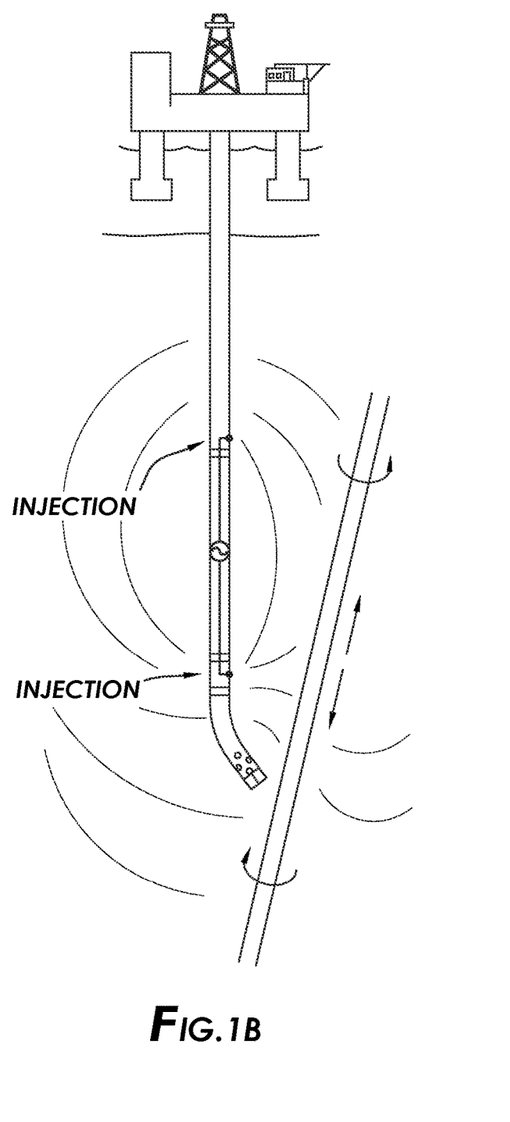
Figure 1C:
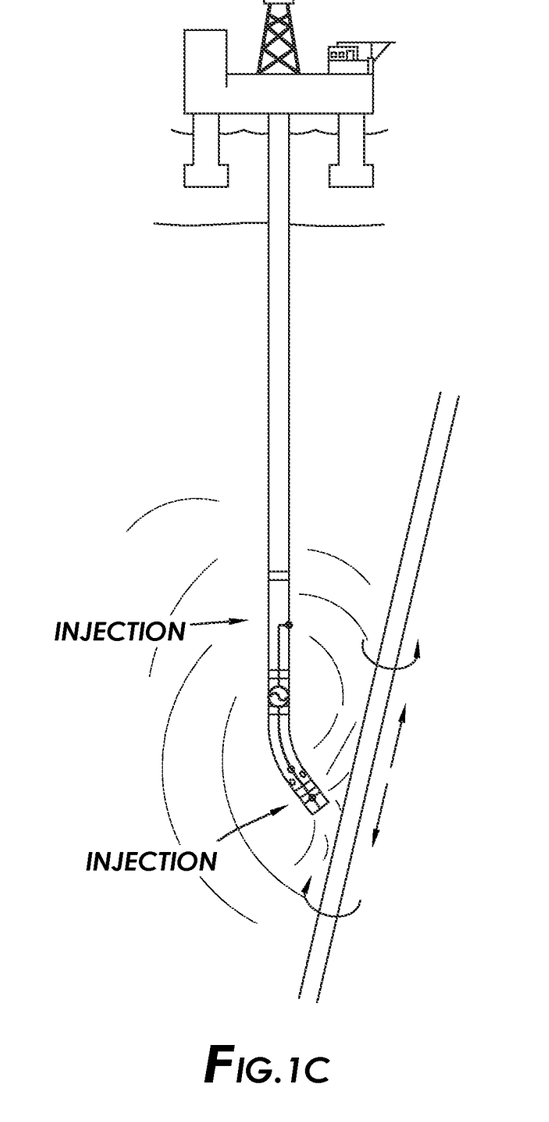

FIG. 1 depicts three configurations of the current injection system. In FIG. 1a, power is supplied at the surface and the excitation supply electrode is downhole with return electrode at the surface. The sensors are the four dots next to the bit, and insulating gaps are shown. In certain embodiments, the current runs through the entirety of the drillstring. In 1b, the power supply is downhole, with the supply electrode above the sensor and the return electrode further up the drill string. This configuration does not require that the upper drillstring carry injection current. In 1c, the injection electrode is in the bit, the return electrode is above the bit such that the current endpoints straddle the sensors.

In the configuration shown in FIG. 1a, the drilling BHA approaches a target borehole, and the sensors are near the bit. In certain embodiments, the sensors are triaxial fluxgate magnetometers that allow the determination of distance and direction to the target well if a current can be placed on the target. The current on the target comes from the current injected into formation through the supply electrode. The power supply at surface delivers the current to the supply electrode along the drillstring between surface and the electrode, using either wired pipe or a wireline deployed through the drillstring. The injected current may travel through formation and return to the return electrode to complete the circuit with the power supply. As the target casing has a higher conductivity than the surrounding formation, some current in the neighborhood of the target will collect on the target to minimize the current return path. This is the source of the signal that is measured by the magnetometers, allowing calculation of direction and distance through the differing signal levels seen at magnetometers in differing positions relative to the current on the target.

In FIG. 1b, the excitation power supply is placed in the drillstring. This placement, coupled with excitation current electrodes in the drillstring, does not require the majority of the drillstring to carry a current path for the excitation current. Separation between the two electrodes allows the current to travel through enough of the formation to not be short circuited directly back onto the drillstring. Insulating gaps in the drillstring may define the electrode locations. Measurement of the magnetic signals and calculation of the distance and direction results proceeds in the same way as 1a.

In FIG. 1c, the sensors are placed between the two electrodes. In 1c, the downward flowing current in the target from the upper electrode and the upward flowing current from the lower electrode will add, providing a larger current signal in the target.

In other embodiments, some sensors may be positioned above and below multiple electrode sections. The additional data from different locations may reduce measurement noise, cross validate results, and assist in tracking the target trajectory from a smaller number of shot locations.

FIG. 1 depicts embodiments in which the ranging magnetometers are near the bit, allowing the target to be located and the drilling well to be positioned near to the bottom of the hole. In certain embodiments, the lower portion of the drillstring may comprise magnetizable steel (including the bit), which may interact with the ranging measurements. In certain embodiments, sensors may be located higher in the drillstring, such as above motors or other large ferromagnetic components. Such positioning may increase the quality of the measurements at the cost of displacing the sensors in the trajectory drilled.

The system may also incorporate insulation on the exterior of the drillstring in between an electrode and the sensors. Insulation may reduce current from short circuiting using the drillstring itself and avoid stray current on the tool body next to the sensors.

The energy source for the excitation power may be from batteries in the drillstring, from a downhole hydraulic generator powered by the mud flow, or a hybrid system that stores energy from the generator for use in shots taken with the pumps off and the drillstring stable.

Figure 3A:
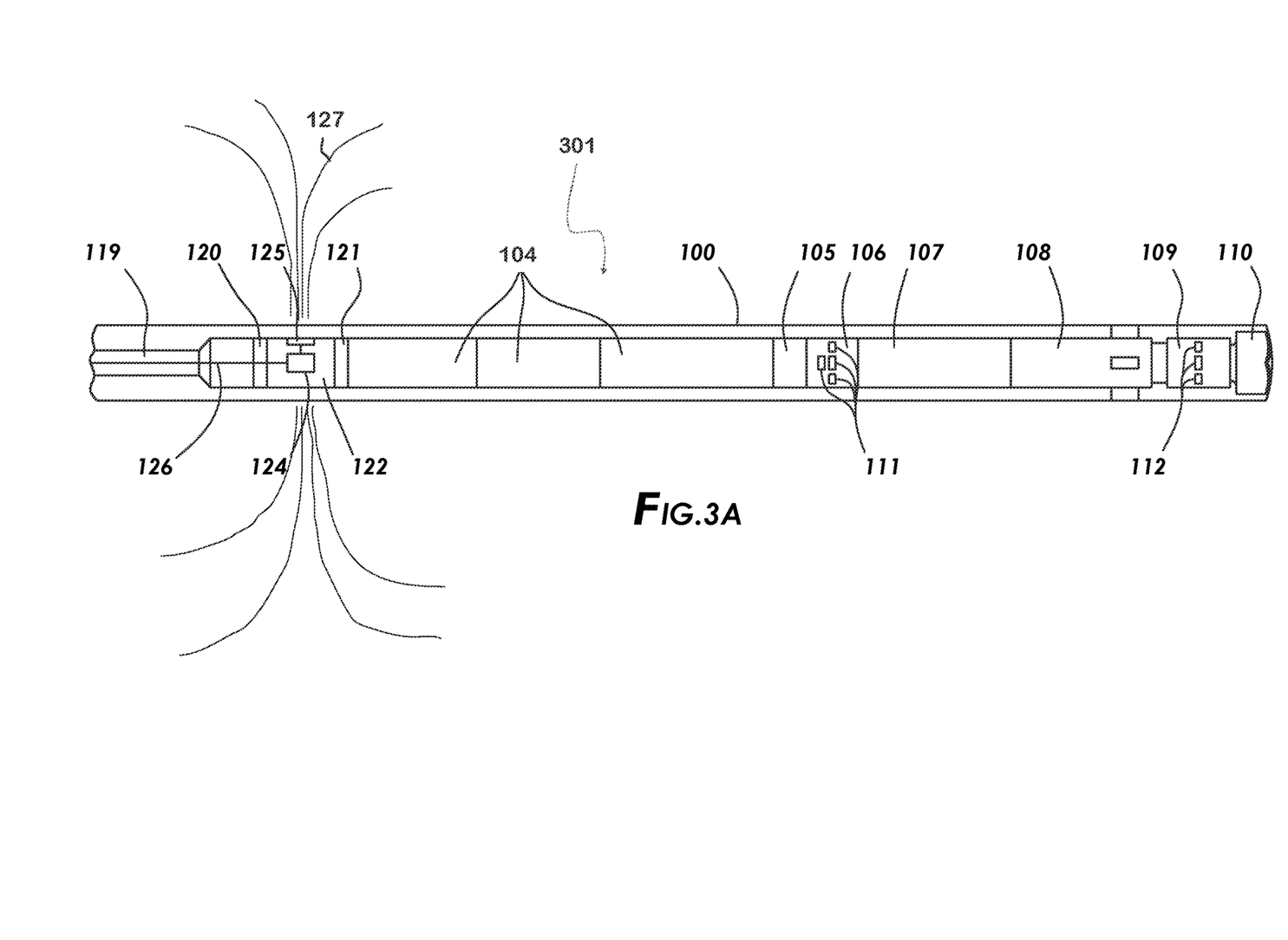
FIGS. 3A and 3B are schematic diagrams of devices for use in conjunction with the concepts illustrated in FIG. 1.
Figure 3B:
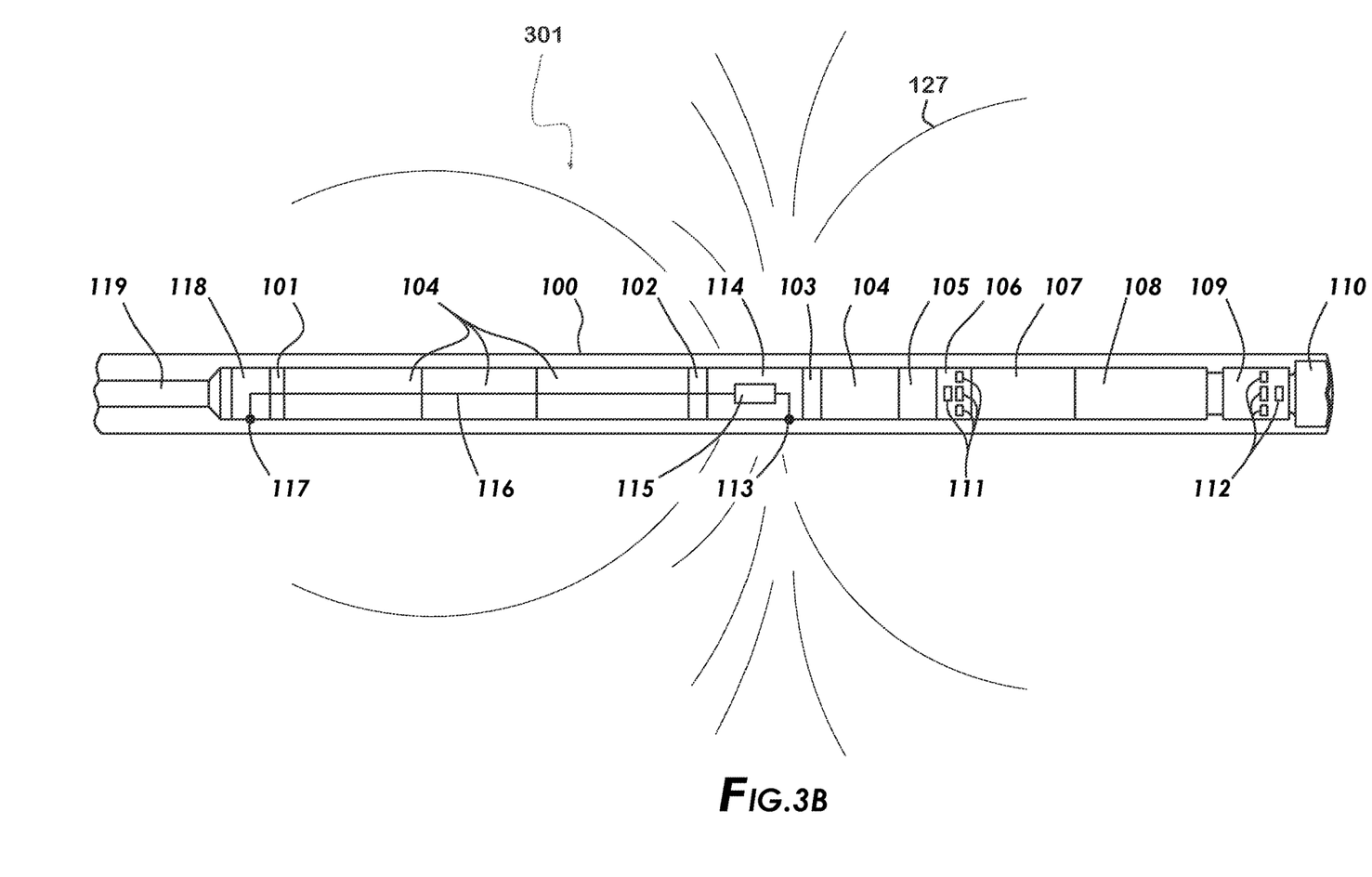

FIGS. 3A and 3B illustrate two embodiments of a drilling BHA 301 suitable for use in the system of FIG. 1a, in which power is supplied at the surface, the excitation supply electrode is downhole, and the return electrode is at the surface. BHA 301 may be a gradient ranging BHA with surface connectivity. BHA 301 is shown on a drill string 119 in an open (uncased) borehole 100. BHA 301 may include a first electrically-insulating gap 101 in the drillstring 119, which serve to separate the upper electrode from the lower portions of the BHA. BHA 301 may include a second electrically insulating gap 102 in the drillstring to further isolate the upper electrode and lower electrodes. BHA 301 may include a third electrically insulating gap 103 in the drillstring—preventing or reducing injected current flow down along the BHA. BHA 301 may include a plurality of spacing collars 104, which may comprise pipes of steel or nonmagnetic composition, these spacing collars are to ensure the injection point is a sufficient distance above gradient BHA components 106 and 109. Additionally, these collars or pipes may in some embodiments contain wiring or other communication infrastructure to allow bidirectional communications between the MWD system 107 and the injection current power supply and controller 115. In other embodiments, there may be no communication between the MWD system 107 and the injection power supply and controller 115 (in which case 115 may operate autonomously). In some embodiments these may be wired or lined drill pipe or collars. In some embodiments collars 104 may have an insulating coating on their outside to prevent injection current accumulation.

BHA 301 may further include a MWD bi-directional telemetry interface 105, an optional first nonmagnetic BHA component 106, an MWD system 107, steerable component 108, an optional second nonmagnetic BHA component 109, and a drill bit 110. BHA 301 may further include first and second gradient magnetometer arrays 111 and 112, respectively, spacing drill collars 104, a BHA ground-isolation gap 121, an upper ground isolation gap 120, an electrode housing/sub 122, and an electrode 125.

MWD bi-directional telemetry interface 105 may be configured to send and receive data from the surface to and from the other BHA components (nonmagnetic BHA component 106, MWD system 107, steerable component 108, and optional second nonmagnetic BHA component 109). Interface 105 may include electromagnetic, mud pulse, or acoustic telemetry, or combinations thereof. Interface 105 could also include a telemetry interface for sending data via modem via connected power/data conductor 126.

Optional first nonmagnetic BHA component 106 houses first gradient magnetometer array 111. BHA component 106 may have electrical or wireless connectivity with the interface 105, or other BHA components (as above). The placement of optional BHA component 106 in FIG. 3A is for illustration only; the component 106 may be positioned anywhere along the length of BHA 301. Likewise, the other BHA components can be positioned or combined as needed.

MWD System 107 may include magnetic and/or inertial sensors, including without limitation magnetometers, accelerometers, gyroscopes, and may also include additional sensors as desired for well drilling.

Optional second nonmagnetic BHA component 109 houses a second gradient magnetometer array 112. Optional BHA component 109 may have electrical or wireless connectivity with the interface 105 or other BHA components (as above). Embodiments of BHA 301 may include one or both of first and second nonmagnetic BHA components 106, 109.

Gradient magnetometer arrays 111, 112 may each comprise three or more cross-axis coplanar tri-axial magnetometer packages, with at least three being spaced as far from the BHA axis as possible.

In the embodiment shown in FIG. 3a, the BHA further includes an electrode power/data interconnect 124 and a power/data conductor 126. Conductor 126 may be installed/integral with the BHA, or may be on a wireline that is run in and connected and disconnected periodically, or a combination of both. Power/Data conductor 126 may be wireline run in drillpipe, wired pipe, or conductor-lined pipe. Conductor 126 may be integral and fixed to the pipe or freely run through the pipe and removable.

Spacing drill collars 123 may include wiring to enable telemetry interface 105 to connect to power/data conductor 126 for the purpose of bi-directional communications to surface. BHA Ground-isolation gap 121 prevents current flow along BHA 301 to and from electrode 125. Upper ground isolation gap 120 prevents current flow along drillstring 119 to and from electrode 125. Electrode power/data interconnect 124 allows a wired connection to surface for power delivery to electrode and optionally bidirectional communications. Interconnect 124 may include a connection to the telemetry interface 105 via optional spacing collars 123.

Electrode 125 is configured to injecting ranging current into the formation surrounding borehole 100. The current flow into formation from electrode 125 in contact with borehole 100 and/or via drilling fluid in the annular space between BHA and borehole is indicated in FIG. 3A by lines 127.

FIG. 3B illustrates another embodiment of a drilling BHA 301 suitable for use in the system of FIG. 1a. While many of the elements are the same, in FIG. 3B BHA 301 includes a lower injection electrode contact 113, a lower injection electrode housing/sub 114, and an injection current power supply and controller 115. In some embodiments, this device may be autonomous, while in other embodiments it may operate in response to commands from a connected MWD. In some embodiments, this may include power generation and storage, and in some embodiments this may include one or more batteries. BHA 301 may also include an upper electrode interconnecting conductor 116. Without limitation, in some embodiments, conductor 116 may be a wireline installed through collars or pipes, and in other embodiments this may be an integrated conductor in wired or conductor-lined drill pipe. BHA 301 may also include an upper injection electrode contact 117, an upper injection electrode housing/sub 118, which may in some embodiments contain interfaces to connector 116 via wireline, wired or lined drill pipe, and a drill pipe to surface 119, which may in some embodiments contain additional electrically insulating gap subs.

Electrode 125 is configured to injecting ranging current into the formation surrounding borehole 100. The current flow into formation from electrode 125 in contact with borehole 100 and/or via drilling fluid in the annular space between BHA and borehole is indicated in FIG. 3B by lines 127.

Figure 2:
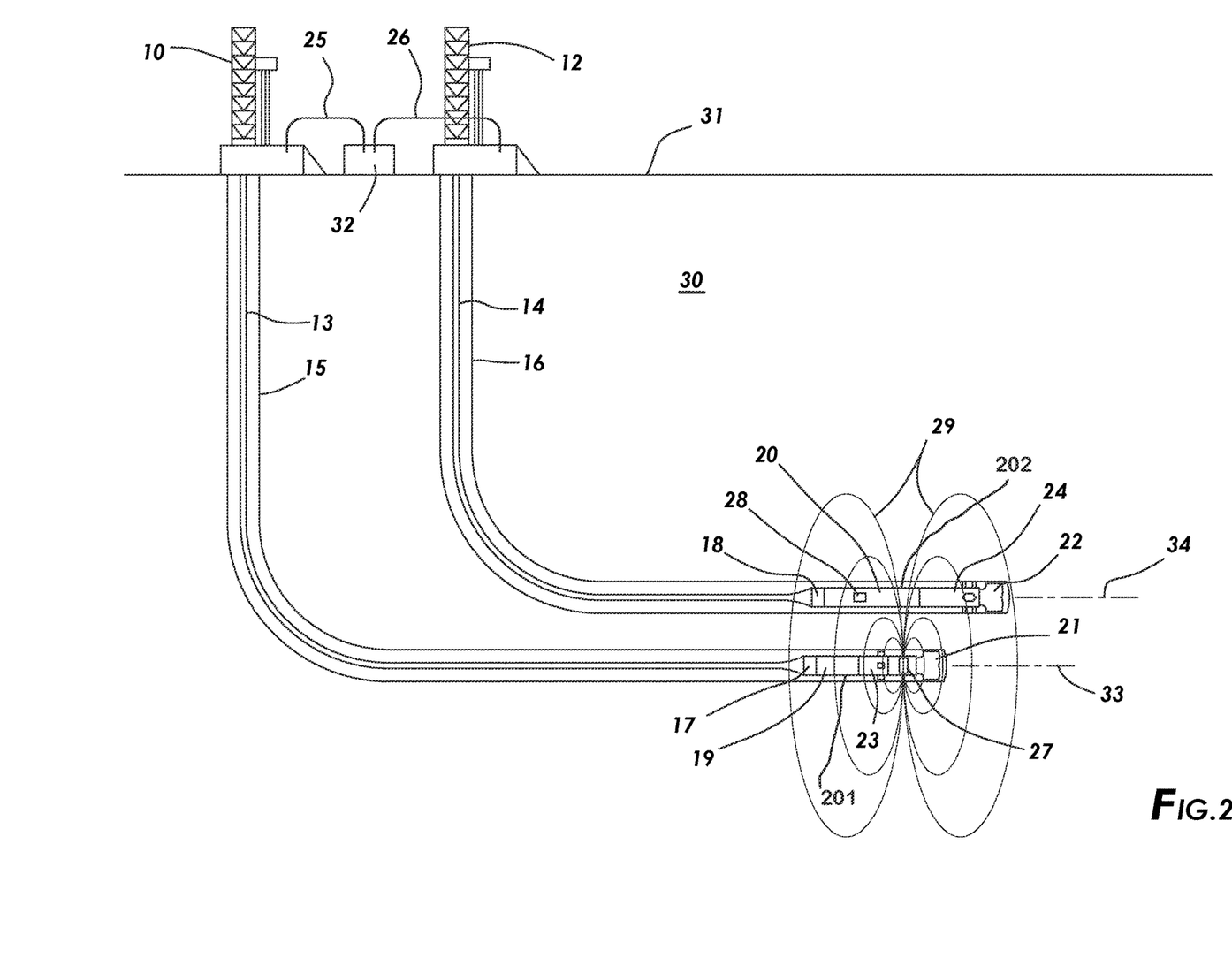
FIG. 2 is a schematic diagram of a system in accordance with an embodiment of the present disclosure.
Figure 6:
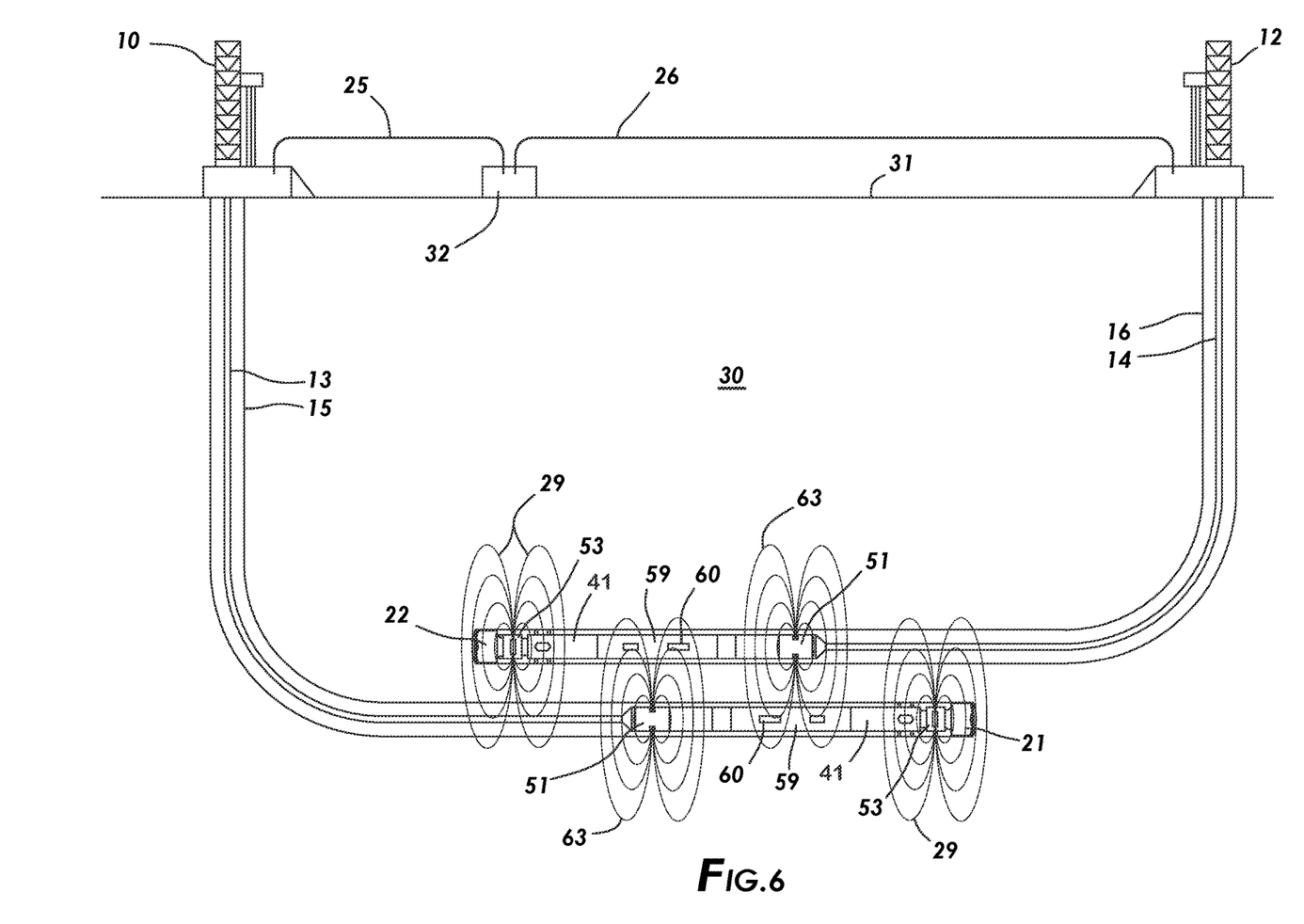
FIG. 6 is a schematic diagram of a system in accordance with another embodiment of the present disclosure.

In an alternative embodiment, two boreholes may be drilled at the same time from separate rigs. In the embodiment shown in FIG. 2 and described below, two wells are oriented in the same general direction and may be substantially parallel. In the embodiment shown in FIG. 6, two wells are oriented generally in opposite directions and may be substantially parallel. The configurations shown in FIGS. 2 and 6 are merely illustrative. The boreholes can both exist at any relative trajectory, and need not be horizontal.

In some embodiments, an alternative ARWD system may include, for example, a magnetometer mounted in a BHA, a magnetic field source comprising a rotating permanent magnet, and an MWD controller. These components may be included on or form part of the BHA.

Referring now to FIG. 2, an exemplary two-hole system may be implemented at the earth's surface 31, with wells extending into the subsurface 30. The first drilling assembly includes a first rig 10 and a first drill string 13 operating in a first borehole 15. First drill string 13 may comprise jointed pipes, coiled tubing, etc. First borehole 15 may or may not include steel or nonmagnetic casing installed in some portions thereof. The lower end of first drill string 13 may include a first bottomhole assembly (BHA) 201 that includes a first borehole bi-directional telemetry interface 17, a first MWD system 19, a first steerable component 23, a first drill bit 21, and a first nonmagnetic BHA component 27. First BHA 201 defines a first borehole axis 33.

First telemetry interface 17 may be a bi-directional interface configured to send and receive data to/from the surface. Examples of suitable telemetry techniques include but are not limited to electromagnetic telemetry, mud pulse telemetry, acoustic telemetry, and combinations of multiple telemetry techniques.

First MWD system 19 may be used to collect navigation data in first borehole 15. First MWD system 19 may include magnetic and/or inertial sensors, including without limitation multiple precision calibrated magnetometers, accelerometers, and gyroscopes, and combinations thereof. The sensors may be DC and/or AC measuring, and may include filtering or processing to improve accuracy in static and/or dynamic conditions.

First steerable component 23 may be a rotary steerable system, bent housing drilling motor, turbine, directional hammer, or any other steerable component.

Nonmagnetic BHA component 27 may include a magnetic field source comprising one or more permanent transverse (cross axis) magnets 207 (shown in FIGS. 4C, 4D) having a north-south axis perpendicular to the borehole axis 33, so as to create an elliptically polarized magnetic field 29 during rotation of BHA 201 about axis 33. Magnetic field 29 appears as an alternating magnetic field at points away from BHA 201.

Still referring to FIG. 2, the second drilling assembly includes a second rig 12 and a second drill string 14 operating in a second borehole 16. Second drill string 14 may comprise jointed pipes, coiled tubing, etc. Second borehole 16 may or may not have steel or nonmagnetic casing installed in some portions thereof. The lower end of second drill string 14 may include a second BHA 202 comprising a second bi-directional telemetry interface 18, a second MWD system 20, a second steerable component 24, a second drill bit 22, and at least one two- or three-axis magnetic field sensor 28. Second BHA 202 defines a second borehole axis 34.

Like first telemetry interface 17, second telemetry interface 18 may be configured to send and receive data to/from the surface and may make use of electromagnetic telemetry, mud pulse telemetry, acoustic telemetry, and combinations of multiple telemetry techniques.

Second MWD system 20 may be used to collect navigation data in second borehole 16. Second MWD system 20 may include magnetic and/or inertial sensors, including without limitation multiple precision calibrated magnetometers, accelerometers, and/or gyroscopes, and combinations thereof. Sensors may be DC and/or AC measuring, and may include filtering or processing to improve accuracy in static and/or dynamic conditions.

Magnetic field sensor 28 may have at least two axes orthogonal to axis 34 and may include sensors mounted so as to enable determination of their direction with respect to second MWD system 20. Data from this sensor may be processed in a downhole computer and results and/or raw data may be sent to surface via second telemetry interface 18. The downhole computer may also use data gathered by the MWD system 20, or data received from surface control system/center (32) via the telemetry interface 18. In this embodiment, single magnetometer is sufficient, but more can be used. Each magnetometer may be built into the wall of a BHA or provided in a sonde or cartridge mounted inside the BHA. As set out below in more detail, the first drilling assembly may also include one or more magnetic field sensors 28.

Like first steerable component 23, second steerable component 24 may be a rotary steerable system, bent housing drilling motor, turbine, directional hammer, or any other steerable component.

The system shown in FIG. 2 further includes a control system 32 located at the surface. Control system 32 may be configured to receive sensor-generated raw data and computed readings and results, which may be sent or used in drilling either borehole 15, 16. Control system 32 may further be configured to send data downhole to either MWD system 19, 20. The system may further include a bi-directional data link 25 between first rig 10 and control system 32 and a bi-directional data link 26 between second rig 12 and control system 32. The system may also include one or more surface transceivers, each located at or near a drilling rig and configured to engage a downhole telemetry interface, as well as additional sensors, power supplies, surface electrodes and/or rig controls, all of which may be connected to a surface computer.

Figure 4A:
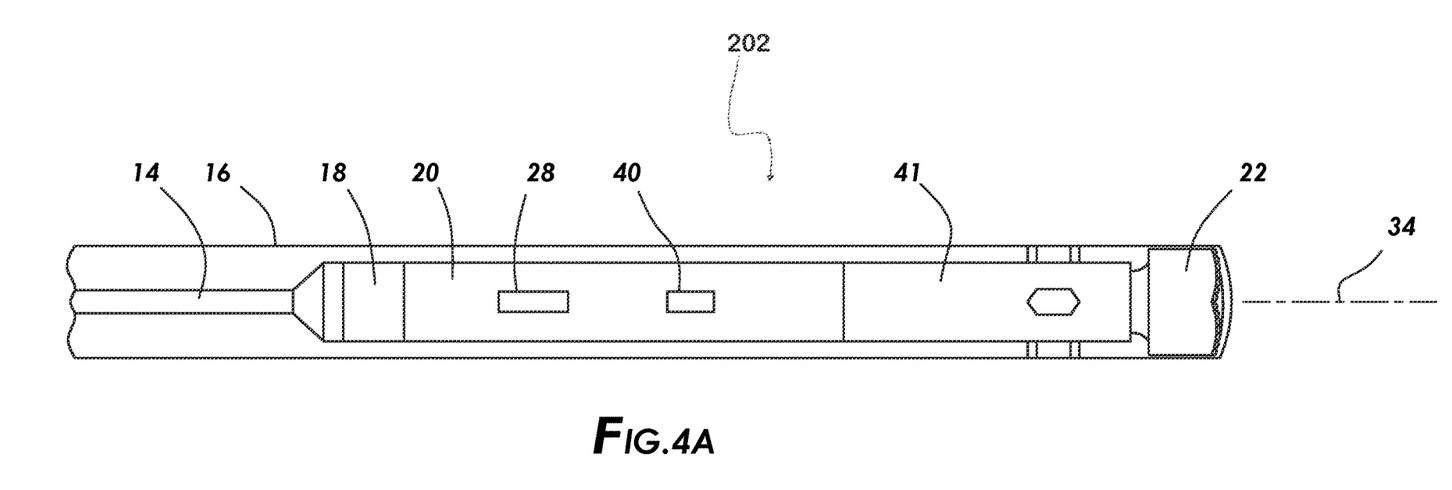
FIGS. 4A-4D are schematic diagrams of devices in accordance with embodiments of the present disclosure.
Figure 4B:
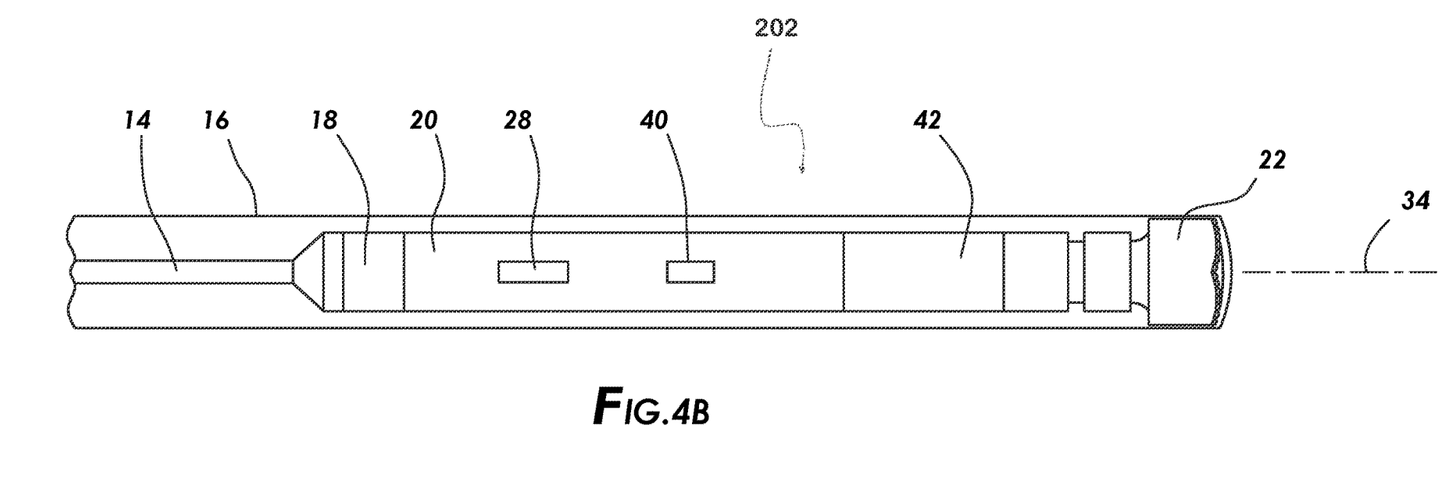
Figure 4C:
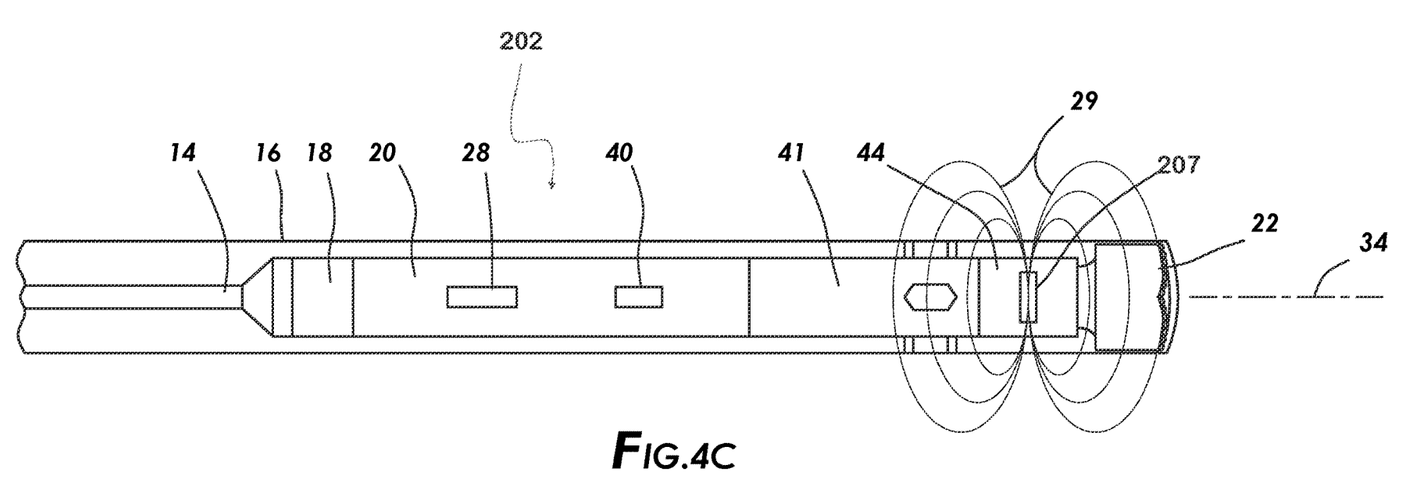
Figure 4D:
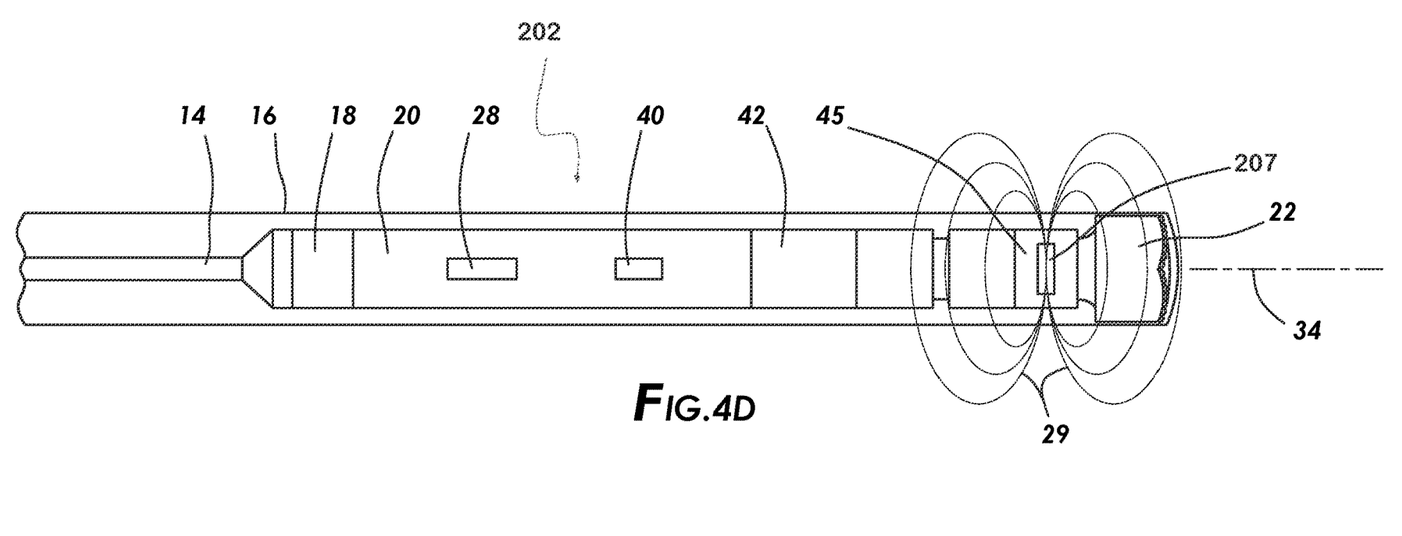

FIGS. 4A-4B illustrate embodiments of BHAs that can be used as second BHA 202 in the systems illustrated in FIG. 2. FIGS. 4C-4D illustrate embodiments of BHAs that can be used as first BHA 201 illustrated in FIG. 2. In the embodiments shown in FIGS. 4A and 4C, second steerable component 24 is a rotary steerable 41. In the embodiments shown in FIGS. 4B and 4D, second steerable component 24 is a bent housing drilling motor 42. As noted above, other steerable components may be used.

In each embodiment, the BHA 201, 202 may include a downhole computer 40 (FIGS. 4A-D), which may be connected to all BHA sensors and can be programmed to collect data and compute results from magnetic field sensor(s) 28 as well as from standard MWD navigation sensors (magnetometers, accelerometers, and/or gyroscopes) and other sensors in the BHA. Downhole computer 40 may be configured to transmit and receive data from second telemetry interface 18.

In the embodiments shown in FIGS. 4C and 4D, BHA 201 also includes at least one optional magnetic field sensor 28. This optional placement of magnetic field sensors 28 on BHA 201 enables BHA 201 to be used as both a ranging source and ranging sensing device, as shown in FIG. 6.

As set out above with respect to FIG. 2, first BHA 201 may include a nonmagnetic BHA component that supports one or more permanent transverse (cross axis) magnets 207 having a north-south axis perpendicular to the borehole axis. As depicted in FIG. 4C, nonmagnetic BHA component 44 may be an extension to a rotary steerable or may be integrated with the rotating portion of a rotary steerable. This component may or may not be a separate piece from the rotary steerable itself.

Alternatively, as depicted in FIG. 4D, nonmagnetic BHA component 45 may be an extension to a positive displacement mud motor with bent housing 42 or integrated with the mandrel of this motor, which reduces length. This component may or may not be a separate piece from the motor itself.

Figure 5:
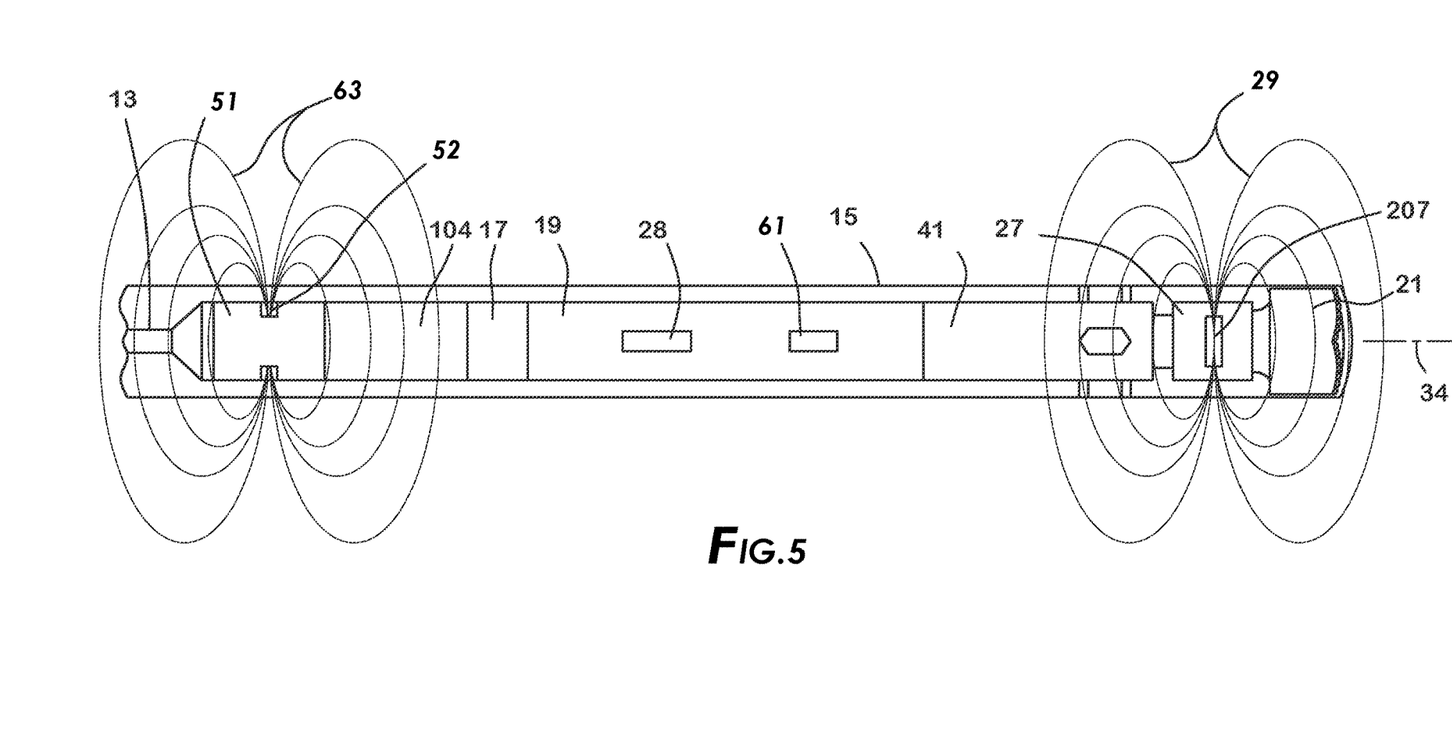
FIG. 5 is a schematic diagram of a device in accordance with another embodiment of the present disclosure.

As shown in FIG. 5, either BHA or both BHAs may include a second magnet sub 51 including permanent magnets 52. Generally, second magnet sub 51 can go anywhere, but in some embodiments it may be above and spaced apart from sensors 28 and 61. In some embodiments second magnet sub 51 may be at least 10 feet, at least 20 feet, or at least 30 feet above sensors 28. Second magnet sub 51 creates a second elliptically polarized magnetic field 63 during rotation of BHA 201. Magnetic field 63 appears as an alternating magnetic field at points away from second magnet sub 51. If the BHA includes a mud motor between nonmagnetic BHA component 45 or 44 and second magnet sub 51, the elliptically polarized magnetic fields created by each sub will appear as overlapping alternating magnetic fields with different frequencies at points away from the respective BHAs.

Referring now to FIG. 6, the concepts described herein can be applied in a system in which two wells are drilled within ranging distance of each other. Each well may be drilled with a drilling assembly that includes at least two magnetic field sources and at least one ranging magnetometer, among the other items mentioned herein. In this embodiment, multiple ranging measurements can be made between the two drillstrings. These measurements may be combined with averaging or data fitting techniques including wellbore survey information, or machine learning methods. As illustrated, each magnetic field source may comprise a rotating permanent magnet and each ranging magnetometer collects ranging data from a location behind the bit.

In a system in which a rotating magnet is positioned at a single location and measurements are made with a single triaxial magnetometer, distance and direction are calculated based on the field measured at the magnetometer using differential gradiometry or source strength calibrated at surface or via downhole measurements at multiple locations (station-based or with a sweep of the drillstring). However, the quality of the source strength estimate may be compromised by local ferromagnetic components in the BHA. In contrast, if multiple sensors spaced apart in the sensing BHA, either radially or longitudinally, or a single radially displaced sensor carouseled or rotated with the BHA, signals from all of the sensors can be used in the calculation. Using data from multiple sensors may be advantageous in cancelling errors due to BHA effect, and may improve results from ranging inside casing, especially during twinning or interception.

In wireline-based systems, the magnetic field and other sensor data may be communicated to the surface and processed there. In this embodiment, the data may optionally be processed downhole in the tool package. Data processing may include:

A) after a layer of filtering, the magnetic field signals from the various magnetometer axes (3 axes per magnetometer, N magnetometers at multiple locations) are coherently measured. The in phase and out of phase components may be assessed separately: nominally, all signal power on all axes should be in phase together with each other and the excitation source, so out of phase signal is an error source that can serve as a qualifier.

B) The average field may be computed, allowing an overall signal strength to be computed, and the direction from sensor to target. From the average, the deltas of each individual magnetometer may be computed, showing how the signal varies in strength and direction from the central average. These deltas allow computation of the distance as a gradient of the magnetic field. The distance can be corrected if desired using the direction as the field direction and the field gradient should have a certain relation if the field source is a current on a nearby linear target. Deviations from this relationship can be used as an additional qualifier.

Certain magnetometer placement locations may improve the accuracy of the calculated results. High radial displacement may allow for maximal deltas for gradient measurements of distance.

When results are computed downhole, communication may be used for reporting results and monitoring, and for command and configuration to be sent downhole. The communications may be accomplished with mud pulse or electromagnetic signal propagation, or wired pipe with a wet connect wireline deployed from surface. Additionally commands can be communicated mechanically, for example by setting a shot to be taken following a delay after pumps and rotation stop.

The system may be configured to use active signal alone, passive signal alone, or a combination of the two. In certain embodiments, this system allows the communication of bit depth from surface to tool, so that this information is available to the calculation algorithm.

This system may incorporate a gyroscopic heading determination, allowing azimuth and toolface to be determined relative to the Earth's rotation rather than the magnetic field alone.

In certain embodiments, the ranging results are available downhole allowing the directional control of the steerable component to be commanded to follow a preplanned wellpath with respect to the target well. This closed loop control system may be based on the active results, passive results, or a combination of each. Bit depth information may be communicated down from surface for use in ranging calculations and drilling parameters such as dogleg achieved. Machine learning techniques may be used to accommodate changes in formation drilling characteristics, smooth ranging noise, and achieve desired intercept objectives. Different modes and parameters can be set by commands from surface, and continuous monitoring of the ranging and drilling results can be sent up for human reporting.

We claim:

1. A system for drilling first and second boreholes in a formation, the system comprising:
   a first drilling assembly in the first borehole, the first drilling assembly including a first drill string, a first drill bit and a first bottomhole assembly (BHA) connected to the first drill bit, the first BHA including a first measurement-while-drilling (MWD) system, a first bi-directional MWD telemetry interface, a first steering component, and a first magnetic field source comprising at first permanent magnet having a north-south axis perpendicular to the longitudinal axis of the first BHA, so as to create an elliptically polarized magnetic field during longitudinal rotation of the first BHA;
   a second drilling assembly in the second borehole, the second drilling assembly including a second drill string, a second drill bit and a second BHA connected to the second drill bit, the second BHA including a second MWD system, a second bi-directional MWD telemetry interface, a second steering component, and at least one ranging magnetometer incorporated into the BHA, wherein the at least one ranging magnetometer is configured to collect ranging measurements of the elliptically polarized magnetic field generated in the first drilling assembly from a location behind the second drill bit,
   a second permanent magnet, the second permanent magnet positioned within the first or second drilling assembly; and
   wherein at least one of the first and second BHAs includes a third permanent magnet having a north-south axis perpendicular to the longitudinal axis of the first BHA, and wherein the third permanent magnet is above and spaced apart along the at least one BHA from the first or second permanent magnet, respectively.

2. A system for drilling first and second boreholes in a formation, the system comprising:
   a first drilling assembly in the first borehole, the first drilling assembly including a first drill string, a first drill bit, and a first bottomhole assembly (BHA) connected to the first drill bit, the first BHA including a first measurement-while-drilling (MWD) system, a first bi-directional MWD telemetry interface, a first steering component, and a first magnetic field source comprising at least one permanent magnet having a north-south axis perpendicular to the longitudinal axis of the first BHA, so as to create an elliptically polarized magnetic field during longitudinal rotation of the first BHA; and
   a second drilling assembly in the second borehole, the second drilling assembly including a second drilling string, a second drill bit and a second BHA connected to the second drill bit, the second BHA including a second MWD system, a second bi-directional MWD telemetry interface, a second steering component, and at least one ranging magnetometer incorporated in the BHA, wherein the at least one ranging magnetometer is configured to collect ranging measurements of the elliptically polarized magnetic field generated in the first drilling assembly from a location behind the second drill bit;
   a second permanent magnet, the second permanent magnet positioned within the first or second drilling assembly, and
   wherein the first BHA further includes a third permanent magnet having a north-south axis perpendicular to the longitudinal axis of the first BHA and wherein the second BHA further includes a fourth permanent magnet having a north-south axis perpendicular to the longitudinal axis of the second BHA, and wherein the third and fourth permanent magnets are above and spaced apart along the respective BHA from the first and second permanent magnets, respectively.

3. A method for drilling first and second boreholes, comprising:
   a) providing a system for drilling first and second boreholes in a formation, the system comprising:
      a first drilling assembly in the first borehole, the first drilling assembly including a first drill string, a first drill bit and a first bottomhole assembly (BHA) connected to the first drill bit, the first BHA including a first measurement-while-drilling (MWD) system, a first bi-directional MWD telemetry interface, a first steerable component, and a first magnetic field source comprising at least one permanent magnet having a north-south axis perpendicular to the longitudinal axis of the first BHA, so as to create an elliptically polarized magnetic field during longitudinal rotation of the first BHA;
      a second drilling assembly in the second borehole, the second drilling assembly including a second drill string, a second drill bit and a second BHA connected to the second drill bit, the second BHA including a second MWD system, a second bi-directional MWD telemetry interface, a second steerable component, and at least one ranging magnetometer incorporated into the second BHA, wherein the at least one ranging magnetometer is configured to collect ranging measurements from behind the second drill bit;

a second permanent magnet, the second permanent magnet positioned within the first or second drilling assembly; and wherein at least one of the first and second BHAs includes a third permanent magnet having a north-south axis perpendicular to the longitudinal axis of the first BHA, and wherein the third permanent magnet is above and spaced apart along the at least one BHA from the first or second permanent magnet, respectively;

b) during rotation of the first BHA, generating a magnetic field using the first magnetic field source;

c) using the at least one ranging magnetometer in the second borehole to measure the magnetic field created in step b); and d) using the measurements made in step c) to steer at least one of the first and second drilling assemblies.

4. The method of claim 3 wherein the first and second drilling assemblies are both rotating during step b).

5. The method of claim 4, further repeating steps b)-d) without surface intervention.

6. The method of claim 4 wherein step d) includes making steering decisions based on active data alone, passive data, or a combination of active and passive data.

7. The method of claim 3 wherein the magnetic field source comprises at least one permanent magnet having a north-south axis perpendicular to the longitudinal axis of the first BHA, so as to create an elliptically polarized magnetic field during longitudinal rotation of the first BHA.

8. The method of claim 3 wherein step c) is carried out without tripping out the first or second drillstring or requiring wireline access to the first or second borehole.

9. The method of claim 3 wherein the magnetic field source comprises one or more permanent transverse magnets having a north-south axis perpendicular to the axis of the first borehole so as to create an elliptically polarized alternating magnetic field during rotation of the first BHA, wherein the ranging magnetometer has at least two axes orthogonal to the axis of the second borehole, and wherein the ranging magnetometer includes sensors mounted so as to enable determination of their direction with respect to the second MWD system.

10. The method of claim 3 wherein the magnetic field source comprises a current injected into formation.

11. The method of claim 10 wherein the first drilling assembly further includes an electrode for injecting current into the formation, and wherein power is supplied to the electrodes via an insulated current path that is integral with the drillstring.

12. The method of claim 3 wherein step d) includes measuring a passive magnetic signature of a ferromagnetic target and computing a distance and direction to the target.

13. The method of claim 3, further including a step of communicating a bit depth downhole from surface and using the bit depth in step d).

14. The method of claim 3 wherein step d) includes making distance and direction calculations downhole.

15. The method of claim 3, further including a step of communicating measurement data to the surface.

16. The method of claim 3, further including a step of communicating raw data to the surface.

17. The method of claim 3 wherein the first and second drilling assemblies each include at least two magnetic field sources and at least one ranging magnetometer.

18. The method of claim 3 wherein step d) includes combining measurements made in step c) with averaging or data fitting techniques including wellbore survey information, or with machine learning methods.

* * * * *

UNITED STATES PATENT AND TRADEMARK OFFICE
CERTIFICATE OF CORRECTION

| | |
|---|---|
| PATENT NO. | : 11,761,264 B2 |
| APPLICATION NO. | : 17/726388 |
| DATED | : September 19, 2023 |
| INVENTOR(S) | : Hawkinson et al. |

It is certified that error appears in the above-identified patent and that said Letters Patent is hereby corrected as shown below:

In the Claims

Claim 2, Column 14, Lines 27-28:
"second drilling assembly including a second drilling
string, a second drill bit and a second BHA connected"
Should read:
"second drilling assembly including a second drill
string, a second drill bit and a second BHA connected"

Claim 2, Column 14, Lines 32-33:
"at least one ranging magnetometer incorporated in the
BHA, wherein the at least one ranging magnetometer is"
Should read:
"at least one ranging magnetometer incorporated into the
BHA, wherein the at least one ranging magnetometer is"

Signed and Sealed this
Seventh Day of November, 2023

Katherine Kelly Vidal
*Director of the United States Patent and Trademark Office*